UNITED STATES PATENT OFFICE.

CHARLES F. BROADBENT, OF BALTIMORE, MARYLAND.

COMPOSITION OF MATTER TO BE USED IN THE MANUFACTURE OF MEDALLIONS, &c.

SPECIFICATION forming part of Letters Patent No. 383,698, dated May 29, 1888.

Application filed November 22, 1887. Serial No. 255,894. (No specimens.)

*To all whom it may concern:*

Be it known that I, CHARLES F. BROADBENT, of the city of Baltimore, in the State of Maryland, have invented an Improved Composition of Matter to be Used in the Manufacture of Medallions, Picture-Frames, and a variety of other articles of use and ornament, of which the following is a specification.

This invention relates to a new composition of matter which may be melted and poured into molds of various kinds to produce articles of use and ornament, as will hereinafter fully appear.

The said material consists of the following ingredients—that is to say, sulphur, pumice-stone, powdered antimony, and ivory-black, or drop-black. The proportions which I prefer are as follows: Sulphur, one hundred parts; pumice-stone, fifty parts; powdered antimony, one part; and ivory or drop black, twenty parts. I do not, however, limit myself to the proportions herein stated, as considerable change may be made without altering the character of the material.

The materials, as above, are melted together in a suitable vessel and thoroughly stirred to make the mass homogeneous, and while in this condition poured in a mold prepared for their reception.

The leading ingredients of the composition are sulphur and pumice-stone, these forming the base; but the other ingredients have their uses—viz., the antimony to give to the casting a metallic luster, and the bone-black to produce a decided color and one which is uniform throughout the entire mass.

Pumice-stone, no matter however finely divided, still consists of porous fragments the cells of which in the mixing process are filled with the melted sulphur, and the fragments of pumice-stone are by that material joined firmly together into a mass.

I claim as my invention—

1. A new composition of matter for the purpose described, which has for its base sulphur and powdered pumice-stone, combined substantially as specified.

2. A new composition of matter which consists of sulphur, pumice-stone, powdered antimony, and bone-black, all combined substantially in the proportions set forth.

CHAS. F. BROADBENT.

Witnesses:
WM. T. HOWARD,
FRANK HODGES.